(12) United States Patent
He et al.

(10) Patent No.: US 9,009,147 B2
(45) Date of Patent: Apr. 14, 2015

(54) FINDING A TOP-K DIVERSIFIED RANKING LIST ON GRAPHS

(75) Inventors: Jingrui He, Ossining, NY (US); Ravi B. Konuru, Tarrytown, NY (US); Ching-Yung Lin, Forest Hills, NY (US); Hanghang Tong, Ossining, NY (US); Zhen Wen, Springfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/213,856

(22) Filed: Aug. 19, 2011

(65) Prior Publication Data

US 2013/0046768 A1 Feb. 21, 2013

(51) Int. Cl.
G06F 17/30 (2006.01)
G06F 7/00 (2006.01)

(52) U.S. Cl.
CPC ...... *G06F 17/3053* (2013.01); *G06F 17/30958* (2013.01); *G06F 17/30592* (2013.01); *G06F 2216/03* (2013.01)

(58) Field of Classification Search
CPC .................... G06F 17/30864; G06F 17/30867
USPC ................................................. 707/723, 728
See application file for complete search history.

(56) References Cited

U.S. PATENT DOCUMENTS

| | | | |
|---|---|---|---|
| 7,730,060 B2 | 6/2010 | Chakrabarti et al. | |
| 7,818,315 B2* | 10/2010 | Cucerzan et al. | 707/723 |
| 8,346,767 B2* | 1/2013 | Yang et al. | 707/728 |
| 2005/0192955 A1 | 9/2005 | Farrell | |
| 2008/0114750 A1* | 5/2008 | Saxena et al. | 707/5 |
| 2008/0154878 A1* | 6/2008 | Rose et al. | 707/5 |
| 2008/0208847 A1* | 8/2008 | Moerchen et al. | 707/5 |
| 2008/0288480 A1 | 11/2008 | Yahia et al. | |
| 2008/0313119 A1 | 12/2008 | Leskovec et al. | |
| 2009/0037440 A1* | 2/2009 | Will et al. | 707/100 |
| 2010/0082606 A1 | 4/2010 | Xu et al. | |
| 2010/0082607 A1 | 4/2010 | Punera et al. | |
| 2010/0153370 A1 | 6/2010 | Gollapudi et al. | |
| 2010/0169360 A1 | 7/2010 | Cohen et al. | |
| 2010/0235317 A1 | 9/2010 | Yu et al. | |
| 2010/0235362 A1 | 9/2010 | Cormode et al. | |
| 2010/0332492 A1 | 12/2010 | Deshpanda et al. | |
| 2011/0016109 A1 | 1/2011 | Vassilvitskii et al. | |

OTHER PUBLICATIONS

Carterette, "An Analysis of NP-Completeness in Novelty and Diversity Ranking", Department of Computer and Infor. Sciences, University of Delaware, USA, Aug. 2, 2010.

(Continued)

*Primary Examiner* — Marc Somers
(74) *Attorney, Agent, or Firm* — Scully, Scott, Murphy & Presser, P.C.; Anne V. Dougherty, Esq.

(57) ABSTRACT

A method, system and computer program product for finding a diversified ranking list for a given query. In one embodiment, a multitude of date items responsive to the query are identified, a marginal score is established for each data item; and a set, or ranking list, of the data items is formed based on these scores. This ranking list is formed by forming an initial set, and one or more data items are added to the ranking list based on the marginal scores of the data items. In one embodiment, each of the data items has a measured relevance and a measured diversity value, and the marginal scores for the data items are based on the measured relevance and the measured diversity values of the data items.

25 Claims, 9 Drawing Sheets

---

ALGORITHM 1

INPUT: The row-normalized adjacency matrix A of the graph, the damping factor $c$, the query vector p, and the budget $k$;
OUTPUT: A subset of $k$ nodes $S$.
1: Compute the ranking vector r: $r = cA'r + (1-c)p$;
2: Initialize $S$ as the empty set; set $u = v = O_{n \times 1}$;
3: for $i = 1 : n$ do
4:    Initialize $\hat{s}(i) = (2 - cA(i,i) - (1-c)p(i))r(i)$;
5: end for
6: for iter $= 1 : k$ do
7:    Compute the score vector $s = \hat{s} - u \otimes r - v$;
8:    Find $i = \mathrm{argmax}_j s(j)(j = 1, ..., n; j \notin S)$;
9:    Add node $i$ into $S$;
10:   Update $u \leftarrow u + cA(:,i) + (1-c)p(i)1_{n \times 1}$;
11:   Update $v \leftarrow v + cA'(:,i)r(i) + (1-c)r(i)p$;
12: end for
13: Return the subset $S$

(56) References Cited

OTHER PUBLICATIONS

Hamalainen, "Efficient Discovery of the Top-K Optimal Dependency Rules With Fisher's Exact Test of Significance", ICDM Inter. Conf. on, Dec. 13-17, 2010, pp. 195-205.

Pipanmaekapom et al., "Deploying Top-K Specific Patterns for Relevance Feature Discovery", WI-IAT Inter. Conf. on, vol. 3, Aug. 31-Sep. 3, 201, pp. 318-321.

IBM et al., "AL Tree: An Attribute Level Tree for Efficient Online Top-K Retrieval Using Arbitrary Distance Measures", IPCOM000165537D, Dec. 19, 2007.

Heo et al., "The Hybrid-Layer Index: A Synergic Approach to Ansering Top-k Queries in Arbitrary Subspaces", IEEE ICDE Conference 2010, Apr. 2010, 978-1-4244-5466-4/10, pp. 445-448.

Zou et al., "Finding Top-k Maximal Cliques in an Uncertain Graph", IEEE ICDE Conference 2010, Apr. 2010, 978-1-4244-5446-4/10, pp. 649-652.

HRL Laboratories, LLC et al., "Finding the Top K Most Relevant Explanation in Bayesian Networks", IPCOM000196872D, Jun. 18, 2010.

Webber et al., "A Similarity Measure for Indefinite Rankings", ACM Transactions on Information Systems, Author's Version, vol. 28, No. 4, Nov. 2010, pp. 1-34.

Tong et al., "Diversified Ranking on Large Graphs: An Optimization Viewpoint", KDD'11, Aug. 21-24, 2011, San Diego, CA, USA, ACM 978-1-60558-193-4/08/088.

Liu et al., "BBM: Bayesian Browsing Model from Petabyte-scale Data", KDD'09, Jun. 28-Jul. 1, 2009, Paris, France.

Haveliwala, "Topic-Sensitive PageRank", WWW2002, May 7-11, 2002, Honolulu, Hawaii, USA.

Kang et al., "PEGASUS: A Peta-Scale Graph Mining System—Implementation and Observations", World Wide Web Internet and Web Information Systems (2009), Publisher: IEEE, pp. 229-238.

Karypis, "Multilevel Hypergraph Partitioning", Technical Report, Department of Computer Science and Engineering, University of Minnesota, Minneapolis, MN, Jun. 17, 2002, pp. 1-29.

Kleinberg, "Authoritative Sources in a Hyperlinked Environment", Proceedings of the ACM-SIAM Symposium on Discrete Algorithms, 1998, and as IBM Research Report RJ 10076, May 1997, Dept. of Computer Science, Cornell University, Ithaca, NY, IBM Almaden Research Center, San Jose, CA, pp. 1-33.

Koren, "Collaborative Filtering with Temporal Dynamics", KD'09, Jun. 28-Jul. 1, 2009, Paris, France.

Koren et al., "Measuring and Extracting Proximity in Networks", KDD'06, Aug. 20-23, 2006, Philadelphia, PA, USA.

Lappas et al., "Finding a Team of Experts in Social Networks", KDD'09, Jun. 28-Jul. 1, 2009, Paris, France.

Agarwal et al., "Estimating Rates of Rare Events at Multiple Resolutions", KDD'07, San Jose, CA, USA.

Leskovec et al., "Cost-effective Outbreak Detection in Networks", KDD'07, Aug. 12-15, 2007, San Jose, CA, USA.

Li, et al., "Enhancing Diversity, Coverage and Balance for Summarization through Structure Learning", WWW 2009, Apr. 20-24, 2009, Madrid, Spain, pp. 71-80.

Angel et al., "Ranking Objects Based on Relationships and Fixed Associations", AMC EDBT 2009, Mar. 24-26, 2009, Saint Petersburg, Russia.

Backstrom et al., "Supervised Random Walks: Predicting and Recommending Links in Social Networks", WSDM'11, Feb. 9-12, 2011, Hong Kong, China.

Broder et al., "Graph structure in the Web", AltaVista Company, San Mateo, CA; IBM Almaden Research Center, San Jose, CA; Compaq Systems Reseach Center, Palo Alto, CA.

Carbonell et al., "The Use of MMR, Diversity-Based Reranking for Reordering Documents and Producing Summaries", ACM, SIGIR '98, Melbourne, Australia, 1988, pp. 335-336.

El-Arini et al., "Turning Down the Noise in the Blogosphere", KDD'09, Jun. 28-Jul. 1, 2009, Paris, France.

Ge et al., "An Energy-Efficient Mobile Recommender System", KDD'10, Jul. 25-28, 2010, Washington, DC, USA.

Geerts et al., "Relational link-based ranking", Proceedings of teh 30th VLDB Conference, Toronto, Canada, 2004.

Li et al., "Fast Single-Pair SimRank Computation", MSRA Internet Service Funding FY09-RES-THEME-061, Renmin University of China; Tsinghua University, The Chinese University of Hong Kong.

Liben-Nowell et al., "The Link Prediction Problem for Social Networks", Jan. 8, 2004, Laboratory for Computer Science, Massachusetts Institute of Technology, Cambridge, MA, Department of Computer Science, Cornell University, Ithaca, NY , pp. 1-19.

Lichtenwalter et al., "New Perspectives and Methods in Link Prediction", KDD'10, Jul. 25-28, 2010, Washington, DC, USA.

Maiya et al., "Sampling Community Structure", WWW 2010, Apr. 26-30, 2010,, Raleigh, North Carolina, USA.

Mei et al., "DivRank: the Interplay of Prestige and Diversity in Information Networks", KDD'1-, Jul. 25-28, 2010, Washington, DC, USA, pp. 1009-1018.

Neville et al., "Evaluating Statistical Tests for Within-Network Classifiers of Relational Data", Purdue University, Lawrence Livermore National Laboratory.

Noble et al., "Graph-Based Anomaly Detection", SIGKDD'03, Aug. 24-27, 2003, Washington, DC, USA.

Page et al., "The PageRank Citation Ranking: Bringing Order to the Web", Jan. 29, 1998, pp. 1-17.

Pemantle, "Vertex-Reinforced Random Walk", Dept. of Statistics, U.C. Berkely, Jun. 26, 2003, pp. 1-28.

Radlinski et al., "Redundancy, Diversity and Interdependent Document Relevance", ACM SIGIR Forum, vol. 43, No. 2, Dec. 2009, pp. 46-52.

Sarkar et al., "Fast Nearest-neighbor Search in Disk-resident Graphs", KDD'10, Jul. 25-28, 2010, Washington, DC, USA.

Satuluri et al., "Scalable Graph Clustering Using Stochastic Flows: Applications to Community Discovery", KDD'09, Jun. 28-Jul. 1, 2009, Paris, France.

Shan et al., "Generalized Probabilistic Matrix Factorizations for Collaborative Filtering", Dept. of Computer Science and Engineering, University of Minnesota, Twin Cities.

Tan et al., "Social Action Tracking via Noise Tolerant Time-varying Factor Graphs", KDD'10, Jul. 25-28, 2010, Washington, DC, USA, pp. 1049-1058.

Tong et al., "Fast Random Walk with Restart and Its Applications", Carnegie Mellon University.

Xin et al., "Mining Compressed Frequent-Pattern Sets", Proceedings of teh 31st VLDB Conference, Trondheim, Norway, 2005.

Yin et al., "Cross-Relational Clustering with User's Guidance", KDD'05, Aug. 21-24, 2005, Chicago, IL, USA.

Yue et al., "Predicting Diverse Subsets Using Structural SVMs", Proceedings of teh 25th International Conference on Machine Learning, Helsinki, Finland, 2008.

Zhu et al., "Improving Diversity in Ranking using Absorbing Random Walks," Department of Computer Sciences, University of Wisconsin Madison, Madison, WI.

Ziegler et al., "Improving Recommendation Lists Through Topic Diversification", WWW 2005, May 10-14, 2005, Chiba, Japan, pp. 22-43.

Heckerman et al., "Dependency Networks for Collaborative Filtering and Data Visualization", Microsoft Research, Redmond, WA.

Office Action dated Nov. 5, 2013 received in a related U.S. Patent Application, namely U.S. Appl. No. 13/213,872.

Office Action dated May 2, 2104 received in a related U.S. Patent Application, namely U.S. Appl. No. 13/213,872.

\* cited by examiner

ALGORITHM 1

INPUT: The row-normalized adjacency matrix A of the graph, the damping factor $c$, the query vector p, and the budget $k$;
OUTPUT: A subset of $k$ nodes $S$.
1: Compute the ranking vector r: $r = cA'r + (1-c)p$;
2: Initialize $S$ as the empty set; set $u = v = 0_{n \times 1}$;
3: for $i = 1 : n$ do
4:     Initialize $\hat{s}(i) = (2 - cA(i,i) - (1-c)p(i))r(i)$;
5: end for
6: for iter $= 1 : k$ do
7:     Compute the score vector $s = \hat{s} - u \otimes r - v$;
8:     Find $i = \text{argmax}_j s(j) (j = 1, ..., n; j \notin S)$;
9:     Add node $i$ into $S$;
10:     Update $u \leftarrow u + cA(:,i) + (1-c)p(i)1_{n \times 1}$;
11:     Update $v \leftarrow v + cA'(:,i)r(i) + (1-c)r(i)p$;
12: end for
13: Return the subset $S$

FIG. 1(a)

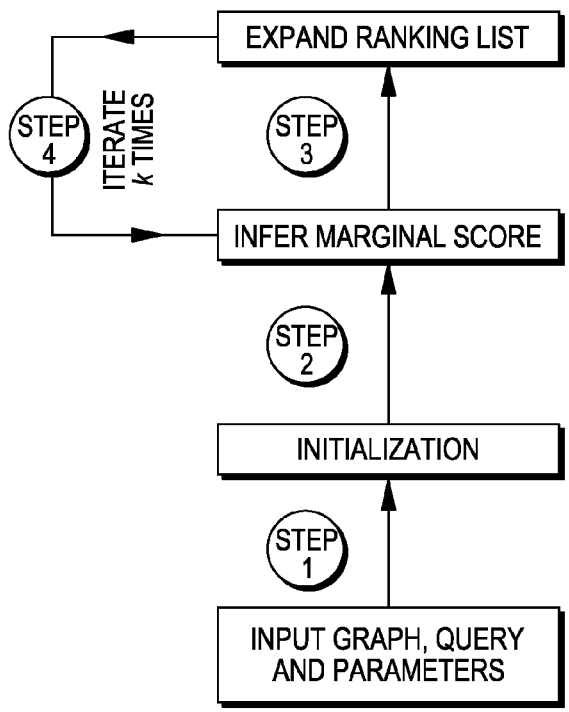

FIG. 1(b)

DIVERSITY AND RELEVANCE TRADE-OFF
DIVERSITY BY 1-STEP NEIGHBORS

DIVERSITY AND RELEVANCE TRADE-OFF
DIVERSITY BY 1- AND 2-STEP NEIGHBORS

FINDING A TOP-K DIVERSIFIED RANKING LIST ON GRAPHS

STATEMENT REGARDING FEDERALLY SPONSORED RESEARCH AGREEMENT

This invention was made with Government support under Contract No.: W911NF-09-2-0053 (Army Research Office (ARO)). The Government has certain rights in this invention.

CROSS-REFERENCE TO RELATED APPLICATION

This application is related to application Ser. No. 13/213,872, filed herewith, now abandoned, for "Measuring The Goodness of a Top-K Diversified Ranking List", the disclosure of which is hereby incorporated by reference in its entirety.

BACKGROUND OF THE INVENTION

The present invention generally relates to ranking data items, and more specifically, to identifying a set of data items based on both relevance and diversity.

It is now widely recognized that diversity is a highly desired property in many data mining tasks, such as expertise and legal search, recommendation systems, blog filtering, document summarization, and others. It is a powerful tool to address the uncertainty and ambiguity and/or to cover the different aspects of an information need. Diversity is also positively associated with personnel performances and job retention rates in a large organization.

Diversified ranking on graphs is a fundamental mining task and has a variety of high-impact applications. Two important questions remain open in diversified ranking on large graphs. The first challenge is the measure—for a given top-k ranking list, how can we quantify its goodness? Intuitively, a good top-k ranking list should capture both the relevance and the diversity. For example, given a task which typically requires a set of different skills, if we want to form a team of experts, not only should the people in the team have relevant skills, but also they should somehow be 'different' from each other so that the whole team can benefit from the diversified, complementary knowledge and social capital. However, there does not exist such a goodness measure for the graph data in the literature. Most of the existing works for diversified ranking on graphs are based on some heuristics. One exception is described in a paper by Mei, et al. (Q. Mei, J. Guo, and D. R. Radev. Divrank: the interplay of prestige and diversity in information networks. In KDD, pages 1009-1018, 2010.) In this paper, the authors made an important step towards this goal by providing some optimization explanations, which is achieved by defining a time-varying objective function at each iteration. But still, it is not clear what overall objective function the algorithm tries to optimize.

The second challenge lies in the algorithmic aspect—how can we find an optimal, or near-optimal, top-k ranking list that maximizes the goodness measure? Bringing diversity into the design objective implies that we need to optimize on the set level. In other words, the objective function for a subset of nodes is usually not equal to the sum of objective functions of each individual node. It is usually very hard to perform such set-level optimization. For instance, a straight-forward method would need exponential enumerations to find the exact optimal solution, which is infeasible even for medium size graphs. This, together with the fact that real graphs are often of large size, reaching billions of nodes and edges, poses the challenge for the optimization algorithm—how can we find a near-optimal solution in a scalable way?

In the recent years, set-level optimization has been playing a very important role in many data mining tasks. Many set-level optimization problems are NP-hard. Therefore, it is difficult, if not impossible, to find the global optimal solutions. However, if the function is monotonic sub-modular with 0 function value for the empty set, a greedy strategy can lead to a provably near-optimal solution. This powerful strategy has been recurring in many different settings, e.g., immunization, outbreak detection, blog filtering, sensor placement, influence maximization and structure learning.

BRIEF SUMMARY

Embodiments of the invention provide a method, system and computer program product for finding a diversified ranking list for a given query. In one embodiment, the method comprises identifying a multitude of date items responsive to the query, and forming a set, or ranking list from these data items. A marginal score, based on given factors, is established for each of the data items, and the set, or ranking list, of the data items is formed based on these marginal scores. This ranking list is formed by forming an initial set of the data items, establishing and expanding this initial set of data items by adding one or more of the data items to the initial list based on the marginal scores of the data items. In an embodiment, at least one of identifying the multitude of data items and forming the set of the data items is carried out by a computer.

In one embodiment, each of the data items has a measured relevance to the query and a measured diversity value, and the marginal scores for the data items are based on the measured relevance and the measured diversity value of the data items.

In an embodiment, the marginal score for each of the data items is initialized at a specified time and adjusted at other defined times.

In one embodiment, the initial set of the data items is expanded by selecting the one of the data items having the highest marginal score, and adding the selected data item to the set of the data items. In an embodiment, data items are added to the set in this way until at least one defined criterion is met. For example, in one embodiment, this defined criterion might be that the last data item added to the initial set is less than a given value.

In one embodiment, the marginal scores for the data items are adjusted each time one of the data items is added to the set of the data items. For example, in an embodiment, these marginal scores may be adjusted based on the measured diversity value of said one of the data items added to the set of the data items.

Embodiments of the invention provide a scalable algorithm (linear with respect to the size of the graph) that generates a provably near-optimal top-k ranking list. In embodiments of the invention, this algorithm (1) has a clear optimization formulation; (2) finds a provably near-optimal solution; and (3) enjoys the linear scalability.

BRIEF DESCRIPTION OF THE SEVERAL VIEWS OF THE DRAWINGS

FIG. 1(a) illustrates an algorithm in accordance with an embodiment of the invention.

FIG. 1(b) shows the operation of the algorithm of FIG. 1(a).

FIG. 7(a) shows the scalability of the algorithm with respect to the number of nodes in the graph, with the number of edges fixed; and FIG. 7(b) shows the scalability of the algorithm with the number of nodes fixed.

DETAILED DESCRIPTION

Figure 2:
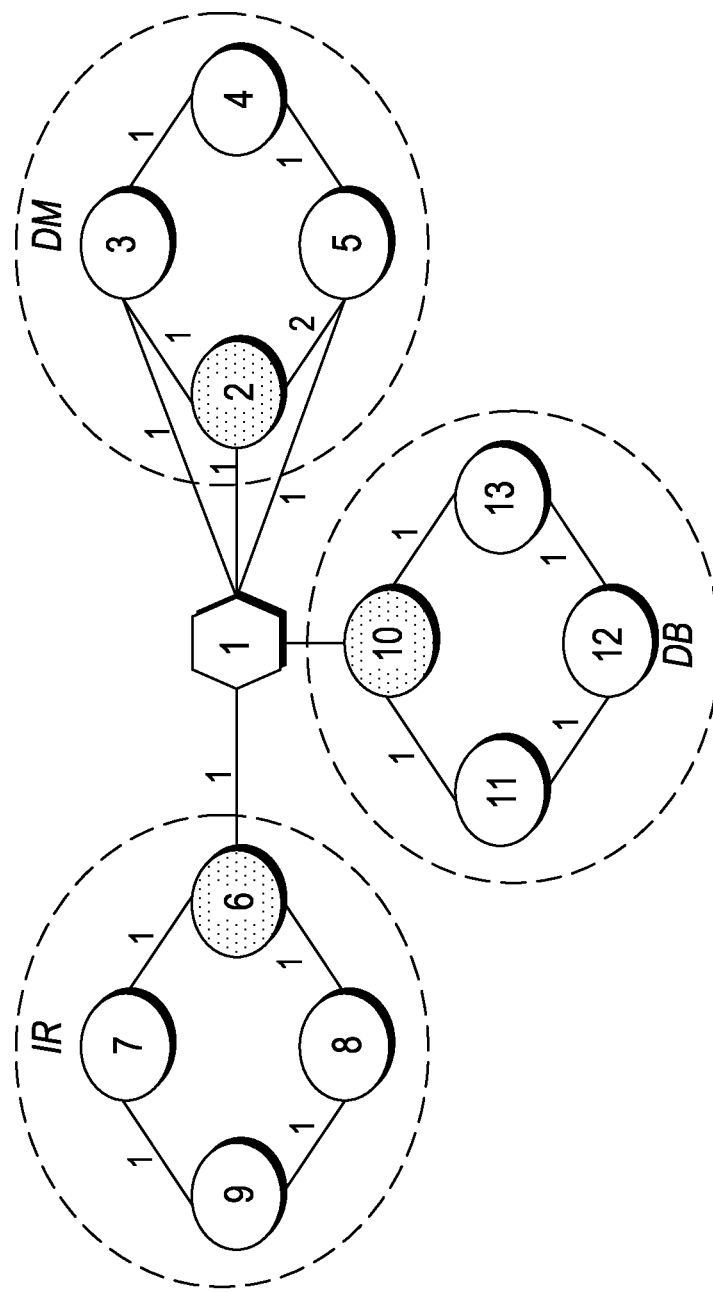
FIG. 2 illustrates a fictitious co-authorship network with each node representing an author and the edge weights representing the number of co-authorized papers.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to identifying a set of data items based on both relevance and diversity. In embodiments of the invention, these data items are selected based on a graph of a larger set of data items, and embodiments of the invention provide a scalable algorithm (linear with respect to the size of the graph) that generates a provably near-optimal top-k ranking list. In embodiments of the invention, this algorithm has a clear optimization formulation, finds a provable near-optimal solution, and enjoys linear scalability.

Table I lists the main symbols used in this description of the invention.

TABLE 1

Symbols

| Symbol | Definition and Description |
|---|---|
| A, B, ... | matrices (bold upper case) |
| A(i, j) | the element at the $i^{th}$ row and $j^{th}$ column of A |
| A(i, :) | the $i^{th}$ row of matrix A |
| A(:, j) | the $j^{th}$ column of matrix A |
| A' | transpose of matrix A |
| a, b, ... | vectors |
| I, J, ... | sets (calligraphic) |
| $\otimes$ | element-wise Hadamard product |
| r | an n × 1 ranking vector |
| p | an n × 1 query vector $\left(p(i) \geq 0, \sum_{i=1}^{n} p(i) = 1\right)$ |
| I | an identity matrix |
| 1 | a vector/matrix with all elements set to 1s |
| 0 | a vector/matrix with all elements set to 0s |
| n, m | the number of the nodes and edges in the graph |
| k | the budget (i.e., the length of the ranking list) |
| c | the damping factor $0 < c < 1$ |

In the description below, we consider the most general case of directed, weighted, irreducible unipartite graphs. We represent a general graph by its adjacency matrix. In practice, we store these matrices using an adjacency list representation, since real graphs are often very sparse. We represent a general graph by its adjacency matrix. Following the standard notation, we use bold upper-case for matrices (e.g., A), bold lower-case for vectors (e.g., a), and calligraphic fonts for sets (e.g., I). We denote the transpose with a prime (i.e., A' is the transpose of A). For a bipartite graph with adjacency matrix W, we can convert it to the equivalent uni-partite graph:

$$A = \begin{pmatrix} 0 & W \\ W & 0 \end{pmatrix}.$$

We use subscripts to denote the size of matrices/vectors (e.g., $A_{n \times n}$ means a matrix of size n×n). When the sizes of matrices/vectors are clear from the context, we omit such subscripts for brevity. Also, we represent the elements in a matrix using a convention similar to Matlab, e.g., A(i, j) is the element at the $i^{th}$ row and $j^{th}$ column of the matrix A, and A(:, j) is the $j^{th}$ column of A, etc. With this notation, we can represent a sub-matrix of A as A(I, I), which is a block of matrix A that corresponds to the rows/columns of A indexed by the set I.

In the description below, we focus on personalized PageRank since it is one of the most fundamental ranking methods on graphs, and has shown its success in many different application domains in the past decade. Formally, it can be defined as follows:

$$r = cA'r + (1-c)p \quad (1)$$

where p is an n×1 personalized vector ($p(i) \geq 0$, $\sum_{i=1}^{n} p(i)=1$). Sometimes, we also refer to p as the query vector, c(0<c<1) is a damping factor; A is the row-normalized adjacency matrix of the graph (i.e., $\sum_{j=1}^{n} A(i, j)=1$ (i=1, ..., n); and r is the n×1 resulting ranking vector. Note that if p(i)=1/n(I=1, ..., n), it is reduced to the standard PageRank; if p(i)=1 and p(j)=0(j≠i), the resulting ranking vector r gives the proximity scores from node I to all the other nodes in the graph.

In order to simplify the description of our upcoming method, we also introduce matrix B:

$$B = cA' + (1-c)p1_{1 \times n} \quad (2)$$

where $1_{1 \times n}$ is a 1×n row vector with all elements set to 1s. Intuitively, the matrix B can be viewed as the personalized adjacency matrix that is biased towards the query vector p. In turns out that the ranking vector r defined in eq. (1) satisfies r=Br. In other words, the ranking vector r is the right eigen-vector of the B matrix with the eigenvalue 1. It can be verified that B is a column-wise stochastic matrix (i.e., each column of B sums up to 1). By Perron-Frobenius theorem, it can be shown that 1 is the largest (in module) simple eigenvalue of the matrix B; and the ranking vector r is unique with all non-negative elements since the graph is irreducible.

Aspects of the invention provide (1) a goodness measure to quantify the quality of a given top-k ranking list that captures both the relevance and the diversity; and (2) given the goodness measure, an optimal or near-optimal or near-optimal algorithm to find a top-k ranking list that maximizes such goodness measure in a scalable way. With the above notations and assumptions, these problems can be formally defined as follows:

PROBLEM 1. (Goodness Measure.)
Given: A large graph $A_{n \times n}$, the query vector p, the damping factor c, and a subset of k nodes S;
Output: A goodness score f(S) of the subset of nodes S, which measures (a) the relevance of each node in S with respect to the query vector p, and (v) the diversity among all the nodes in the subset S.

PROBLEM 2. (Diversified Top-k Ranking Algorithm.)
Given: A large graph $A_{n \times n}$, the query vector p, the damping factor c, and the budget k;
Find: A subset of k nodes S that maximizes the goodness measure f(S).

Solutions for these two problems are discussed below.

The Goodness Measure

An aspect of an embodiment of the invention is to define a goodness measure to quantify the quality of a given top-k ranking list that captures both the relevance and the diversity. We first discuss some design objective of such a goodness measure; and then present a solution followed by some theoretical analysis and discussions.

Design Objectives

As said before, a good diversified top-k ranking list should balance between the relevance and the diversity. The notion of relevance is clear for personalized PageRank,—larger value in the ranking vector r means more relevant with respect to the query vector p. On the other hand, the notion of diversity is more challenging. Intuitively, a diversified subset of nodes should be dis-similar with each other. Take the query 'Find the top-k conferences for Dr. Y. from the author-conference network' as an example. Dr. Y Yu is a professor at a University, and his recent major research interest lies in databases and data mining. He also has broad interests in several related domains, including systems, parallel and distributed processing, web applications, and performance modeling, etc. A top-k ranking list for this query would have high relevance if it consists of all the conferences from databases and data mining community (e.g., SIGMOD, VLDB, KDD, etc.) since all these conferences are closely related to his major research interest. However, such a list has low diversity since these conferences are too similar with each other (e.g., having a large overlap of contributing authors, etc.). Therefore, if we replace a few databases and data mining conferences by some representative conferences in his other research domains (e.g., ICDCS for distributed computing systems, WWW for web applications, etc.), it would make the whole ranking list more diverse (e.g., the conferences in the list are more dissimilar to each other).

Furthermore, if we go through the ranking list from top down, we would like to see the most relevant conferences appear first in the ranking list. For example, a ranking list in the order of 'SIGMOd', 'ICDCS', 'WWW' is better than 'ICDCS', 'WWW', 'SIGMOD' since databases (SIGMOD) is a more relevant research interest for Dr. Y, compared with distributed computing systems (ICDCS), or web applications (WWW). In this way, the user can capture Dr. Y's main research interest by just inspecting a few top-ranked conferences/nodes. This suggests the so-called diminishing returns property of the goodness measure—it would help the user to know better about Dr. Y's whole research interest if we return more conferences/nodes in the ranking list; but the marginal benefit becomes smaller and smaller as we go down the ranking list.

Another implicit design objective lies in the algorithmic aspect. The proposed goodness measure should also allow us to develop an effective and scalable algorithm to find an optimal (or at least near-optimal) top-k ranking list from large graphs.

To summarize, for a given top-k ranking list, we aim to provide a single goodness score that (1) measures the relevance between each individual node in the list and the query vector p; (2) measures the similarity (or dis-similarity) among all the nodes in the ranking list; (3) exhibits some diminishing returns property with respect to the size of the ranking list; and (4) enables some effective and scalable algorithm to find an optimal (or near-optimal) top-k ranking list.

The Measure

Let A be the row-normalized adjacency matrix of the graph, B be the matrix defined in eq (2), p be the personalized vector and r be the ranking vector. For a given ranking list S (i.e., S gives the indices of the nodes in the ranking list; and |S|=k), a goodness measure in an embodiment of the invention is formally defined as follows:

Goodness Measure: (3)
$$f(S) = 2\sum_{i \in S} r(i) - \sum_{i,j \in S} B(i,j)r(j)$$

We can also represent f(S) by using the matrix A instead:

$$f(S) = 2\sum_{i \in S} r(i) - c\sum_{i,j \in S} A(j,i)r(j) - (1-c)\sum_{j \in S} r(j) \sum_{i \in S} p(i)$$

where c is the damping factor in personalized PageRank, and $1_{1 \times |S|}$ is a row vector of length |S| with all the elements set to 1s. It can be shown that it is equivalent to eq. (3).

Notice that the goodness measure in eq. (3) is independent of the ordering of the different nodes in the subset S. If we simply change the ordering of the nodes for the same subset S, it does not affect the goodness score. However, as discussed below, we can still output an ordered subset based on the diminishing returns need when the user is seeking a diverse top-k ranking list.

Proofs and Analysis

Let us analyze how the proposed goodness measure of eq. (3) meets the design objective discussed above.

There are two terms in eq. (3), the first term is twice the sum of the ranking scores in the ranking list. For the second term, recall that B can be viewed as the personalized adjacency matrix with respect to the query vector p, where B(i,j) indicates the similarity (i.e., the strength of the connection) between nodes I and j. In other words, the second term in eq. (3) is the sum of all the similarity scores between any two nodes i, j(i,j∈S) in the ranking list (weighted by r(j)). Therefore, the proposed goodness measure captures both the relevance and the diversity. The more relevant (higher r(i)) each individual node is, the higher the goodness measure f(S). At the same time, it encourages the diversity within the ranking list by penalizing the (weighted) similarity between any two nodes in S.

The measure f(S) of eq. (3) also exhibits the diminishing returns property, which is summarized in Theorem 1 below. The intuitions of Theorem 1 are as follows: (1) by P1, it means that the utility of an empty ranking list is always zero; (2) by P2, if we add more nodes into the ranking list, the overall utility of the ranking list does not decrease; and (3) by P3, the marginal utility of adding new nodes is relatively small if we already have a large ranking list.

THEOREM 1. Diminishing Returns Property of f(S). Let Φ be an empty set, I, J, R be three sets s.t., I⊆J, and R∩J=Φ. The following facts hold for f(S):
P1: f(Φ)=0;
P2: f(S) is monotonically non-decreasing, i.e., f(I)≤f(J);
P3: f(S) is sub modular, i.e., f(I∪R)−F(I)≥f(J∪R)−f(J).
PROOF of P1. It is obviously held by the definition of f(S).
PROOF of P2. Let T=J\I. Substituting eq. (3) into f(J)−f(I) and canceling the common terms, we have $$f(\mathcal{J}) - f(\mathcal{I}) = 2\sum_{i \in T} r(i) - \sum_{i \in T}\sum_{j \in T} B(i,j)r(j) - \qquad (4)$$

-continued $$\sum_{i \in T}\sum_{j \in \mathcal{J}} B(i,j)r(j)$$

$$= \left(\sum_{j \in T} r(j) - \sum_{j \in T}\sum_{i \in I} B(i,j)r(j)\right) +$$

$$\left(\sum_{i \in T} r(i) - \sum_{i \in T}\sum_{j \in \mathcal{J}} B(i,j)r(j)\right)$$

Recall that the matrix B is a column-wise stochastic matrix (i.e., each column of B sums up to 1). The first half of eq. (4) satisfies $$\left(\sum_{j\in\mathcal{T}} r(j) - \sum_{j\in\mathcal{T}}\sum_{i\in I} B(i,j)r(j)\right) = \sum_{j\in\mathcal{T}} r(j)\left(1 - \sum_{i\in I} B(i,j)\right) \quad (5)$$

$$= \sum_{j\in\mathcal{T}} r(j)\sum_{i\notin I} B(i,j) \geq 0$$

For the second half of eq. (4), we have that $$\left(\sum_{i\in\mathcal{T}} r(i) - \sum_{i\in\mathcal{T}}\sum_{j\in J} B(i,j)r(j)\right) = \sum_{i\in\mathcal{T}}\left(r(i) - \sum_{j\in J} B(i,j)r(j)\right) \quad (6)$$

$$= \sum_{i\in\mathcal{T}}\sum_{j\notin J} B(i,j)r(j) \geq 0$$

The last equality in eq. (6) is due to the fact that r=Br, and each element is r is non-negative.

Putting eq. (4)-(6) together, we have that f(J)≥f(I), which completes the proof of P2.

PROOF of P3. Again, let T=J\I. Substituting eq. (4) into (f(I∪R)−f(I))−(f(J∪r)−f(J)) and canceling the common terms, we have $$(f(\mathcal{I}\cup\mathcal{R}) - f(\mathcal{I})) - (f(\mathcal{J}\cup\mathcal{R}) - f(\mathcal{J})) =$$

$$\left(\sum_{j\in\mathcal{J}}\sum_{j\in R} B(i,j)r(j) - \sum_{i\in I}\sum_{j\in R} B(i,j)r(j)\right) + \sum_{i\in R}\sum_{j\in\mathcal{J}\cup R} B(i,j)r(j) -$$

$$\sum_{i\in R}\sum_{j\in I\cup R} B(i,j)r(j) = \sum_{j\in R}\sum_{i\in\mathcal{T}} B(i,j)r(j) + \sum_{i\in R}\sum_{j\in\mathcal{T}} B(i,j)r(j) \geq 0$$

Therefore, we have that f(I∪R)−f(I)≥f(J∪R)−f(J), which completes the proof of P3.

Discussion

In eq. (3), the coefficient '2' balances between the relevance (the first term) and the diversity (the second term). If we change the coefficient '2' to a parameter w, we have the following generalized goodness measure:

Generalized Goodness Measure: (7)

$$g(S) = w\sum_{i\in S} r(i) - \sum_{i,j\in S} B(i,j)r(j)$$

We have the following corollary for this generalized goodness measure. It says that as long as the weight w≥2, the generalized goodness measure g(S) still exhibits the diminishing returns property. This gives our method extra flexibility if the user wants to put more emphasis on relevance for some applications.

COROLLARY 2. Generalized Goodness Measure. Let Φ be an empty set; I, J, R be three sets s.t. $\mathcal{I}\subseteq\mathcal{J}$, and R∩J=Φ. For any w≥2, the following facts hold for g(S):

P1: g(Φ)=0;
P2: g(S) is monotonically non-decreasing, i.e., g($\mathcal{I}$)≤g($\mathcal{J}$);

P3: g(S) is submodular, i.e., g($\mathcal{I}\cup\mathcal{R}$)−g($\mathcal{I}$)≥g($\mathcal{J}\cup\mathcal{R}$)−g($\mathcal{J}$).

The Algorithm

In this section, we address Problem 2. Here, given the initial query vector p and the budget k, we want to find a subset of k nodes that maximizes the goodness measure defined in eq. (3). We would like to point out that although we focus on eq. (3) for the sake of simplicity, the proposed algorithm can be easily generalized to eq. (7) where the user wants to specify the weight w for the relevance.

Challenges

Problem 2 is essentially a subset selection problem to find the optimal k nodes that maximize eq. (3). Theorem 1 indicates that it is not easy to find the exact optimal solution of Problem 2—it is NP-hard to maximize a monotonic submodular function if the function value is 0 for an empty set. For instance, a straight-forward method would take exponential enumerations $$\binom{n}{k}$$

to find the exact optimal k nodes, which is not feasible in computation even for a medium size graph (e.g., with a few hundred nodes).

We can also formulate Problem 2 as a binary indicator vector (x(i)=1 means node i is selected in the subset S, and 0 means it is not selected). Problem 2 can be expressed as the following binary quadratic programming problem:

$$\min x'Dx \quad (8)$$

Subject to: $x(i) \in \{0, 1\}(i = 1, \ldots n)$ $$\sum_{i=1}^{n} x(i) = k$$

where $D=(B-2I_{n\times n})\mathrm{diag}(r)$, $I_{n\times n}$ is an identity matrix of size n×n, and diag(r) is a diagonal matrix with r(i, i)(i=1, . . . , n) being the diagonal elements.

The Algorithm

FIG. 1(a) shows an algorithm used in an embodiment of the invention, and FIG. 1(b) illustrates the operation of this algorithm. With reference to FIG. 1(a), in step 1 of the algorithm, we compute the ranking vector r (e.g., by the power method, etc.) Then after some initializations (steps 2-5), we select k nodes one-by-one as follows. At each time, we compute the score vector s in step 7. Then, we select one node with the highest score in the vector s and add it to the subset S (steps 8-9). After that, we use the selected node to update the two reference vectors u and v (steps 10-11). Note that '⊗' denotes the element-wise product between two matrices/vectors. Intuitively, the score vector s keeps the marginal contribution of each node for the goodness measure given the current selected subset S. From step 7, it can be seen that at each iteration, the values of such marginal contribution either remain unchanged or decrease. This is consistent with P3 of Theorem 1—as there are more and more nodes in the subset S, the marginal contribution of each node is monotonically non-increasing. It is worth pointing out that we use the original normalized adjacency matrix A, instead of the matrix B in Alg. 1. This is because for many real graphs, the matrix A is often very sparse, whereas the matrix B might not be. To see this, notice that B is a full matrix if p is uniform. In the case B is dense, it is not efficient in either time or space to use B in Alg. 1.

In Alg. 1, although we try to optimize a goodness measure that is not affected by the ordering of different nodes in the subset, we can still output an ordered list to the user based on the iteration in which these nodes are selected—earlier selected nodes in Alg. 1 are placed at the top of the resulting top-k ranking list. This ordering naturally meets the diminishing returns need when the user is seeking for a diverse top-k ranking list as we analyzed above.

Analysis

In the discussion below, we analyze the optimality as well as the complexity of Algorithm 1. This discussion shows that this algorithm leads to a near-optimal solution, and at the same time it enjoys linear scalability in both time and space.

The optimality of Algorithm 1 is given in Lemma 1, below. According to this Lemma, this algorithm is near-optimal—its solution is within a fixed fraction $(1-1/e \approx 0.63)$ from the global optimal one. Given the hardness of Problem 2, such near-optimality is acceptable in terms of optimization quality.

LEMMA 1. Near-Optimality Let S be the subset found by Alg. 1: $|S|=k$; and $S^*=\text{argmax}_{|S|=k} f(S)$. We have that $f(S) \geq (1-1/e)f(S^*)$, where e is the base of the natural logarithm.

PROOF. Let T be the subset found at the end of the $t^{th}$ $(t=1, \ldots, k-1)$ iteration of Alg. 1. At step 7 of the $(t+1)^{th}$ iteration, for any node $i \notin T$, we have that $$u(i) = c\sum_{x \in \mathcal{T}} A(i, x) + (1-c)\sum_{x \in \mathcal{T}} p(x) \quad (9)$$

$$v(i) = c\sum_{y \in \mathcal{T}} A'(i, y)r(y) + (1-c)p(i)\sum_{y \in \mathcal{T}} r(y)$$

$$s(i) = \hat{s}(i) - u(i)r(i) - v(i)$$

For any node $i \notin T$, plugging eq. (3) into $f(T \cup \{I\})-f(T)$ and canceling the common terms, we have that $$f(\mathcal{T} \cup \{i\}) - f(\mathcal{T}) = \quad (10)$$

$$2r(i) - B(i, i)r(i) - r(i)\sum_{x \in \mathcal{T}} B(x, i) - \sum_{y \in \mathcal{T}} B(i, y)r(y)$$

By eq. (2), we can further verify that $$\hat{s}(i) = 2r(i) - B(i, i)r(i) \quad (11)$$

$$u(i) = r(i)\sum_{x \in \mathcal{T}} B(x, i)$$

$$v(i) = \sum_{y \in \mathcal{T}} B(i, y)r(y)$$

Therefore, we have that $s(i)=f(T \cup \{i\})-f(T)$. In other words, at step 8 of each iteration of Alg. 1, we always select a node with the highest marginal increase of the goodness measure. By Theorem 1, the goodness measure f(S) is a non-decreasing submodular function with $f(\Phi)=0$. According to A. Krause and C. Guestrin, Beyond convexity—submodularity in machine learning, (In ICML, 2008), we have that $f(S) \geq (1-1/e)f(S^*)$, which completes the proof.

Time Complexity.

The time complexity of the proposed DRAGON is given in Lemma 2. According to Lemma 2, our DRAGON has linear time complexity with respect to the size of the graph. Therefore it is scalable to large graphs in terms of computational time.

LEMMA 2. Time Complexity. The time complexity of Alg. 1 is O(m+nk).

We would like to point out that the Alg. 1 can be further sped up. Firstly, notice that the O(m) term in Lemma 2 comes from computing the ranking vector r (step 1) by the most commonly used power method. There are a lot of fast methods for computing r, either by effective approximation or by parallelism. These methods can be naturally plugged in Alg. 1, which might lead to further computational savings. Secondly, the O(nk) term in Lemma 2 comes from the greedy selection step in steps 6-12. Thanks to the monotonicity of f(S) as we show in Theorem 1, we can use the similar lazy evaluation strategy as J. Leskovee, A. Krasue, C. Guestrin, C. Faloutsos, J. M. VanBriesen, and N. S. Glace, Cost-effective outbreak detection in networks, (In KDD, pages 420-429, 2007), to speed up this process, without sacrificing the optimization quality.

Space Complexity.

The space complexity of Alg. 1 is given in Lemma 3. According to Lemma 3, Alg. 1 has linear space complexity with respect to the size of the graph. Therefore it is also scalable to large graphs in terms of space cost.

LEMMA 3. Space Complexity. The space complexity of Alg. 1 is O(m+n+k).

TABLE 2

Comparison of different methods. Alg. 1 is the only method that leads to a near-optimal solution with liner scalability.

| Method | Measure | Optimality | Scalability | Convergence |
|--------|---------|------------|-------------|-------------|
| ARW [42] | NA | NA | No | Yes |
| RRW [27] | Partial | NA | Yes | NA |
| DRAGON | Yes | Near-optional | Yes | Yes |

Experimental Evaluation

In the discussion below, we provide empirical evaluations for Algorithm 1. These evaluations mainly focus on (1) the effectiveness and (2) the efficiency of Algorithm 1.

Experimental Setup

Data Sets.

We use the DBLP publication data to construct a co-authorship network, where each node is an author and the edge weight is the number of the co-authored papers between the two corresponding persons. Overall, we have n=418,236 nodes and m=2,753,798 edges. We also construct much smaller co-authorship networks, using the authors from only one conference (e.g., KDD, SIGIR, SIGMOD, etc.). For example, KD is the co-authorship network for the authors in the 'KDD' conference. These smaller co-authorship networks typically have a few thousand nodes and up to a few tens of thousands edges. We also construct the co-authorship networks, using the authors from multiple conferences (e.g., KDD-SIGIR). For these graphs, we denote them as Sub(n,m), where n and m are the numbers of nodes and edges in the graph, respectively.

Parameter Settings.

There is a damping factor c to compute the personalized PageRank, which is set to be c=0.99. In the discussion herein, we use the power method to compute the PageRank. We adopt the same stopping criteria as [H. Tong, C. Faloutsos, and J.-Y.

Pan, Fast random walk with restart and its applications. In ICDM, pages 613-622, 2006.]: either the $L_1$ difference of the ranking vectors between two consecutive iterations is less than a pre-defined threshold ($10^{-9}$), or the maximum number of iteration steps (80) is reached. There are no additional parameters in Alg. 1. For the remaining parameters of those comparative methods, they are set as in their original papers, respectively.

Machine Configurations.

For the computational cost and scalability, we report the wall-clock time. All the experiments ran on the same machine with four 2.5 GHz AMD CPUs and 48 GB memory, running Linux (2.6 kernel). For all the quantitative results, we randomly generate a query vector p and feed it into different methods for a top-k ranking list with the same length. We repeat it 100 times and report the average.

Evaluation Criteria.

There does not appear to be any universally accepted measure for diversity. In [Q. Mei, J. Guo, and D. R. Radev, Divrank: the interplay of prestige and diversity in information networks. In KDD, pages 1009-1018, 2010.], the authors suggested an intuitive notion based on the density of the induced subgraph from the original graph A by the subset S. The intuition is as follows: the lower the density (i.e., the less 1-step neighbors) of the induced subgraph, the more diverse the subset S. Here, we generalize this notion to the t-step graph in order to also take into account the effect of those in-direct neighbors. Let sign(.) be a binary function operated element-wise on a matrix, i.e., Y=Sign(X), where Y is a matrix of the same size as X, Y(i,j)=1 if X(i,j)>0, Y(i,j)=0 otherwise. We define the t-step connectivity matrix $C^t$ as $C^t=\text{Sign}(\Sigma_{i=1}^{t} A^i)$. That is, $C^t(i,j)=1$ (0) means that node i can (cannot) reach node j on the graph A within t-steps/hops. With this $C^t$ matrix, we define the diversity of a given subset S s eq. (12). Here, the value of Div(t) is always between 0.5 and 1—higher means more diverse. If all the nodes in S are reachable from each other within t-steps, we say that the subset S is the least diverse (Div(t)=0.5). On the other extreme, if all the nodes in S cannot reach each other within t-steps, the subset S is the most diverse (Div(t)−1).

$$Div(t) = \frac{1}{1 + \sum_{i,j \in S, i \neq j} C^t(i,j) / (|S| \cdot (|S|-1))} \quad (12)$$

For the task of top-k ranking, the notion of diversity alone, though important, might not be enough for the information need. For example, if we simply randomly select k nodes as the top-k ranking list, these k nodes might not be connected with each other at all given that the length of the ranking list k is usually much smaller than the number of nodes n in the graph. Therefore, it has a high diversity. However, it is unlikely that such a ranking list can well fit the user's information need since each of them might have very low relevance score. In other words, a diversified top-k ranking list should also have high relevance. That said, we will mainly focus on evaluating how different methods balance between the diversity and the relevance.

Notice that the relevance score for each individual node is often very small on large graphs (since the $L_1$ norm of the ranking vector is 1). To make the two quantities (diversity vs. relevance) comparable with each other, we need to normalize the relevance scores. Let Ŝ be the top-k ranking list by the original personalized PageRank, we define the normalized relevance score for a given subset S(|S|=k) s eq. (13). Since the personalized PageRank always gives the k most relevant nodes, the Rel defined in eq. (13) is always between 0 and 1—higher means more relevant.

$$Rel = \frac{\sum_{i \in S} r(i)}{\sum_{i \in \hat{S}} r(i)} \quad (13)$$

Effectiveness: Case Studies

Let us start with an illustrative example to gain some visual intuitions. In FIG. 2, we show a fictitious co-authorship network 20, where each node corresponds to an author (e.g., John, Smith, etc.), and the edge weight is the number of the co-authored papers. There are three communities in this network (e.g., DM, DB and IR). From FIG. 2, we can see that node 1 has very strong connections to the DM community. In other words, SM might be his/her major research interest. In addition, s/he also has some connections to the IR and DB communities. Given the budget k=3, personalized PageRank returns all the three nodes (nodes 2, 3 and 5) form DM community which is consistent with the intuition since personalized PageRank solely focuses on the relevance. In contrast, Alg. 1 returns nodes 2, 6 and 10, each of which is still relevant enough to the query node 1. At the same time, they are diversified from each other, covering the whole spectrum of his/her research interest (DM DB, and IR).

We also conduct case studies on real graphs. We construct a co-authorship networks from SIGIR (the major conference on information retrieval) and ICML (the major conference on machine learning). We issue a query to find the top-10 co-authors for Prof. YY. The results are shown in Table III.

TABLE 3

Top-10 Authors for Prof. YY

| using algorithm 1 | Personalized PageRank |
|---|---|
| JZ | JZ |
| RJ | BK |
| BK | RJ |
| J-YN | TP |
| W-YM | MR |
| TP | TA |
| JOP | AGH |
| NL | JYN |
| JGC | NL |
| CXZ | AL |

We compare it with the original personalized PageRank. YY is a professor, and she has broad interest in information retrieval and machine learning. From FIG. 2, we have the following observations. Firstly, both Alg. 1 and personalized PageRank share the same authors for the top-3 returned authors, indicating that Alg. 1 also captures those highly relevant authors with respect to the querying author. Secondly, Alg. 1 returns a more diverse list of authors. For example, although ex 7 is not a co-author of YY, they share a lot of research interest in information retrieval, and have a lot of indirect connections through other IR people. In contrast, the existence of some authors in the ranking list by personalized PageRank is somehow redundant, in terms of helping the user to understand Prof. YY's whole collaboration network. For example, consider Prof. AGH. Although, he has a lot of co-authored papers with YY, they are also co-authored with RV. Therefore, given that JZ and RJ are already in the ranking list, his existence does not provide much marginal information about YY's collaboration network. As a quantitative indicator, the average degree of induced subgraph by Alg. 1 is only 2.8, which is much lower (i.e., more diverse) than that by personalized PageRank. Finally, notice that for some authors, although they show up in both lists, their positions in the ranking list are different. For example, JYN shows at the $4^{th}$ and the $8^{th}$ positions in the two ranking lists, respectively. This is because JYN makes the top-4 authors more diverse compared with ThP, although its individual relevance score is lower than the latter.

Comparison with Alternative Methods for Diversified Ranking on Graphs

We compare Alg. 1 with ARW and RRW, both of which also aim to improve the diversity of personalized PageRank. We skip the comparison with MMR for brevity since it has been shown that its performance is not as good as RRW for the graph-type data. For RRW, it has two variants based on different approximation methods it actually uses: the one based on the cumulative estimation (referred to as 'RRW-a') and the other one based on the pointwise estimation (referred to as 'RRW-b').

Figure 3A:
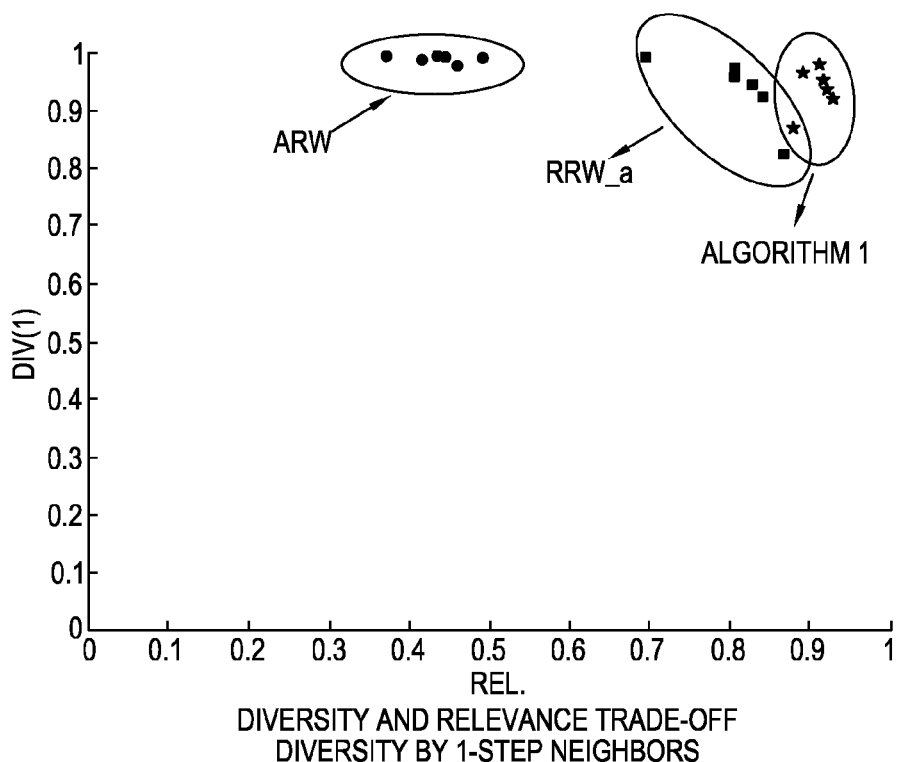
FIGS. 3(a) and 3(b) show data items grouped in order to achieve a balance between diversity and relevance, using two different measures of diversity.
Figure 3B:
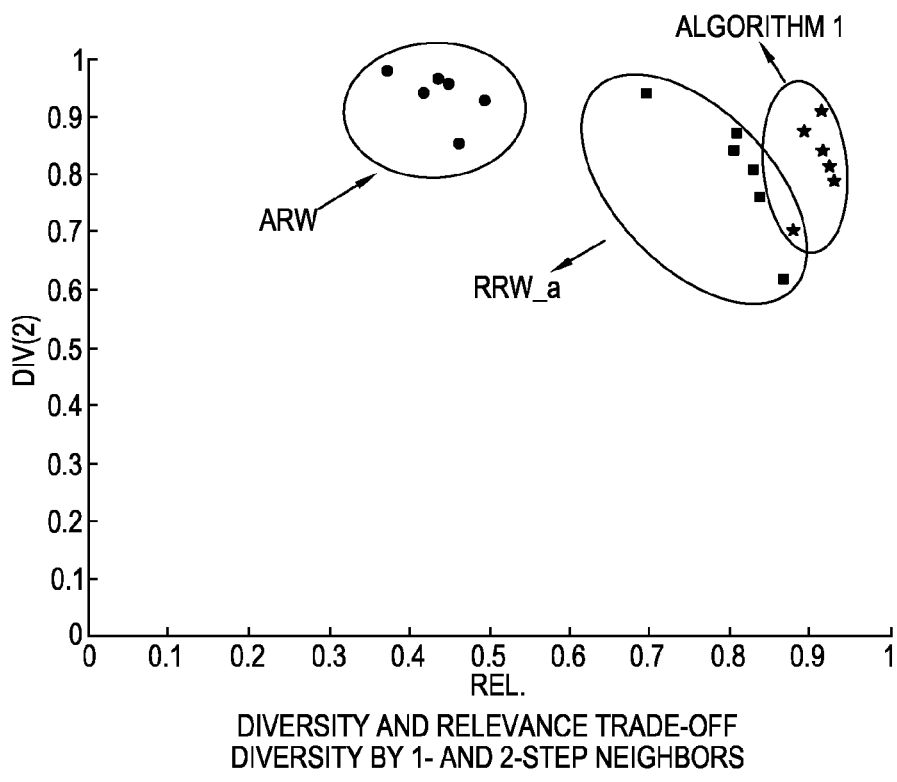
Figure 4A:
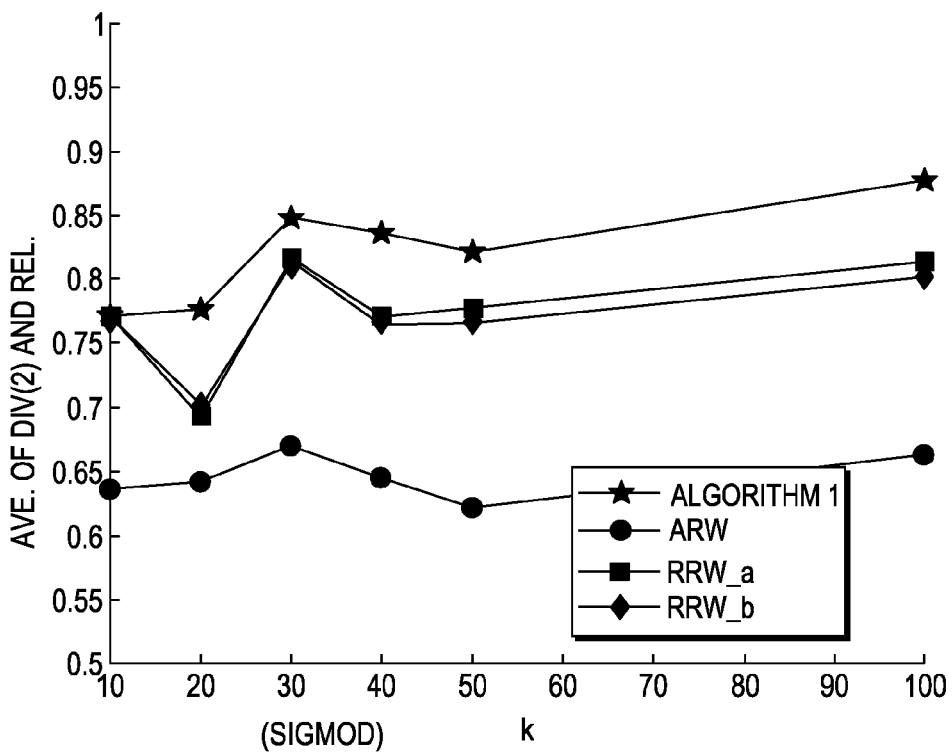
FIG. 4(a) shows scores for diversity and relevance for a number of data sets, plotted vs. the sizes of the data sets, where those data sets are obtained from a particular co-authorship network using four different methods.
Figure 4B:
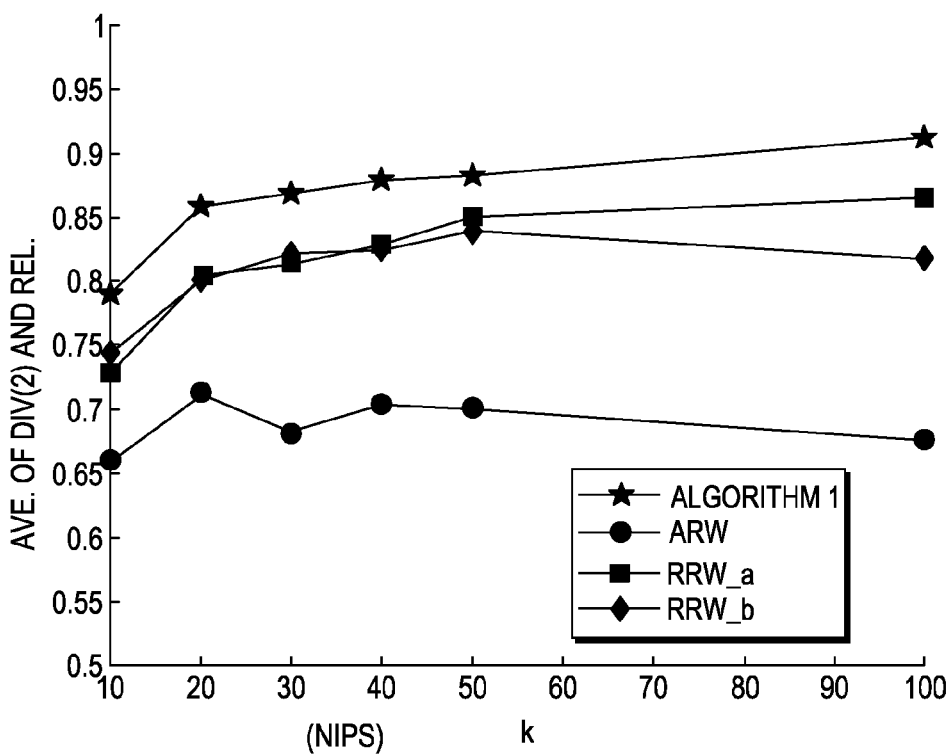
FIG. 4(b), similar to FIG. 4(a), shows scores for diversity and relevance for a number of data sets, plotted vs. the sizes of the data sets, where those data sets are obtained from a second co-authorship network using four different methods.
Figure 4C:
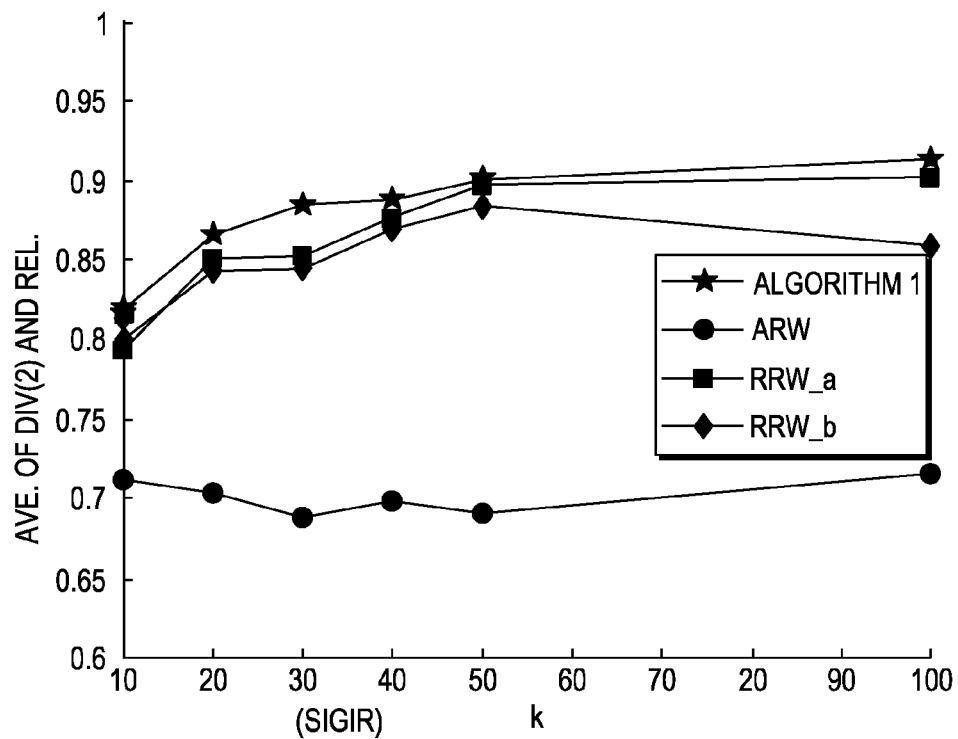
FIG. 4(c) shows scores for diversity and relevance for a number of data sets, plotted vs. the sizes of the data sets, where those data sets are obtained from a third co-authorship network using four different methods.
Figure 4D:
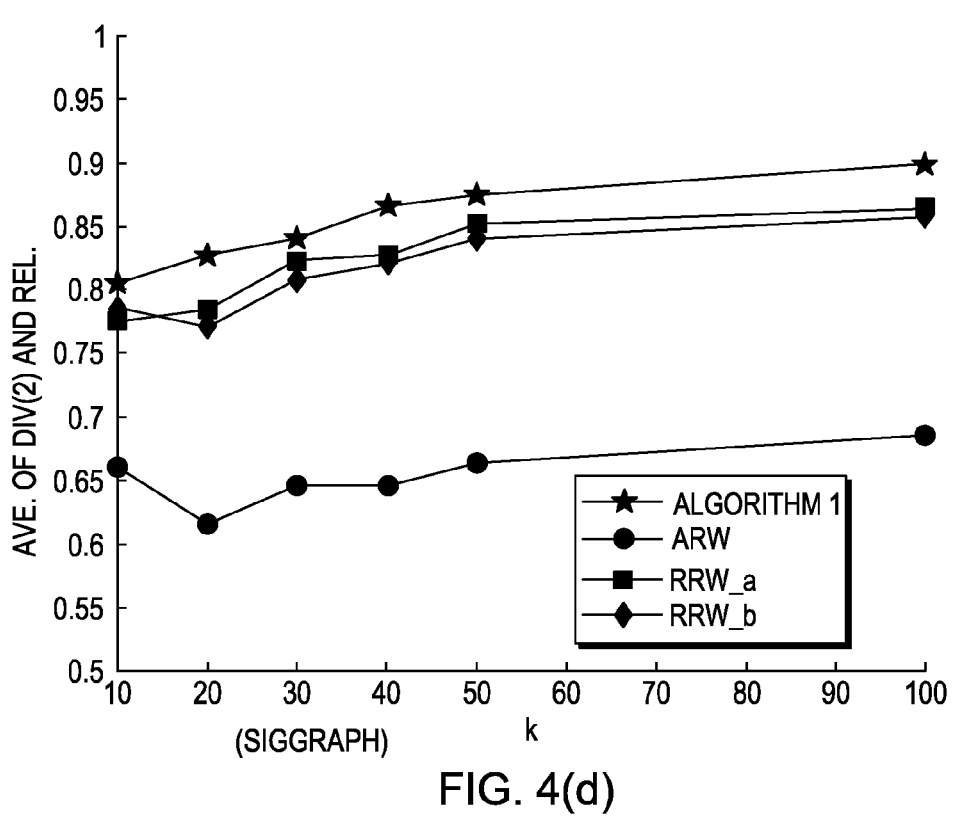
FIG. 4(d) shows scores for diversity and relevance for a number of data sets, plotted vs. the sizes of the data sets, where those data sets are obtained from a fourth co-authorship network using four different methods.

First, let us compare how different methods balance between the relevance and the diversity. FIG. 3 shows the results on the NIPS co-authorship network. We test with different budgets (k=10, 20, 30, 40, 50, 100). In FIG. 3(a), Div(1) means that we only consider 1-step neighbors to measure the diversity (i.e., setting t=1 in eq. (12)). In FIG. 3(b), Div(2) means that we consider both 1-step and 2-step neighbors (i.e., setting t=2 in eq. (12)). We only present the results by RRW-a since RRW-b gives similar results. From FIG. 3, we can see that all the three methods are effective to improve the diversity. The Alg. 1 achieves a better balance between the relevance and the diversity. For ARW, although it gives the highest diversity score, its (normalized) relevance score is too low—only about half of the other two methods. This is because in ARW, only the first node is selected according to the relevance; and all the remaining (k-1) are selected by diversity. As for RRW-a, both its relevance and diversity scores are lower than Alg. 1. It is interesting to notice from FIG. 3(b) that the diversity of RRW-a drops a lot when it is measured by within 2-step neighbors (i.e., Div(2)). This is consistent with the intuition of RRW. In RRW (both RRW-a and RRW-b), it achieves the diversity by encouraging 1-step neighboring nodes to compete with each other. Consequently, the density of its within 1-step induced subgraph might be low (i.e., high diversity), but it is not necessarily the case for the within t-step (t≥2) induced subgraph.

In order to test how the overall performance of different methods varies across different data sets, we take the average between relevance and diversity scores. The results are presented in FIG. 4(a)-4(d), using four different co-authorship networks (SIGMOD, NIPS, SIGIR, SIGGRAPH). For the space limitation, we omit the results when the diversity is measured by within 1-steps neighbors, which is similar as the results by within 2-steps neighbors. It can be seen that Alg. 1 consistently performs the best.

Comparisons with Alternative Optimization Methods

In the discussion below, we evaluate the effectiveness and the efficiency of Algorithm 1 in terms of maximizing the goodness measure f(S). We compare it with the exponential enumeration and the binary quadratic programming methods discussed above.

We also compare it with two other heuristics. The first method (referred to as 'Heuristic1') starts with generating a candidate pool (e.g., the top 10×k most relevant nodes), picks one seed node, and then repeatedly adds the most dis-similar (measured by A) node into the ranking list from the candidate pool. The second method (referred to as 'Heuristic2') also starts with generating a candidate pool, puts all the nodes from candidate pool in the list, and then repeatedly drops a most similar (measured by A) node from the list.

Figure 5:
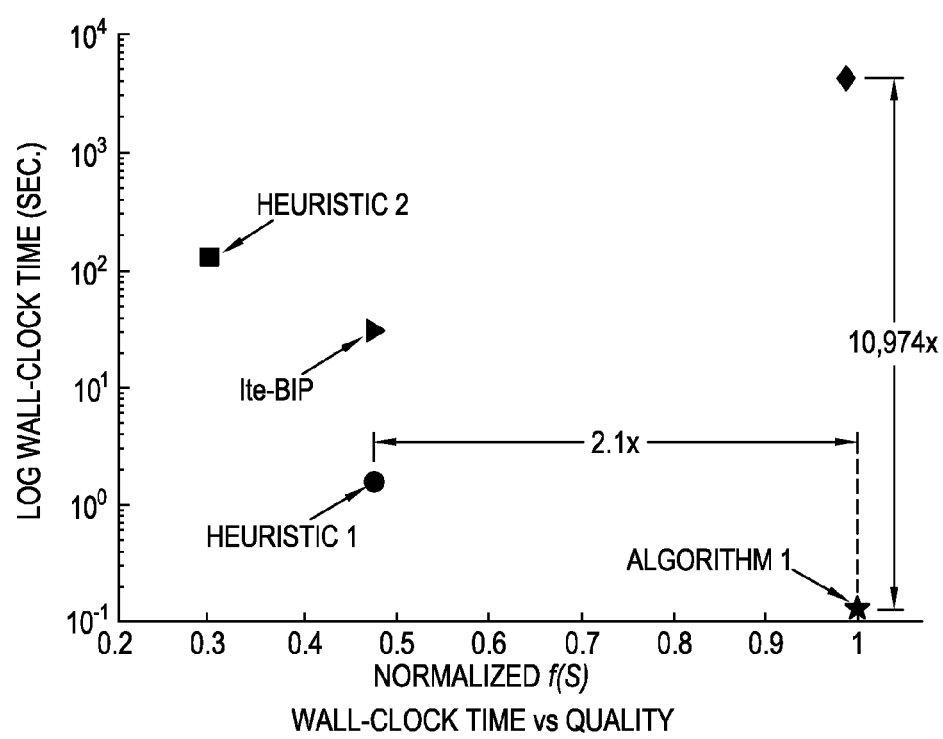
FIG. 5 illustrates how various ranking procedures balance between an optimization quality and speed.

First, let us evaluate how the different methods balance between the optimization quality (measured by f(S)) and the speed (measured by wall-clock time). FIG. 5 shows the results from the co-authorship network of NIPS and KDD conferences with the budget k=20, where f(S) is normalized by the highest one among different methods. It can be seen that Alg. 1 is the best—it leads to the highest optimization quality (i.e., highest f(S)) with the least amount of wall-clock time. Notice that the y-axis is in logarithm scale.

Figure 6A:
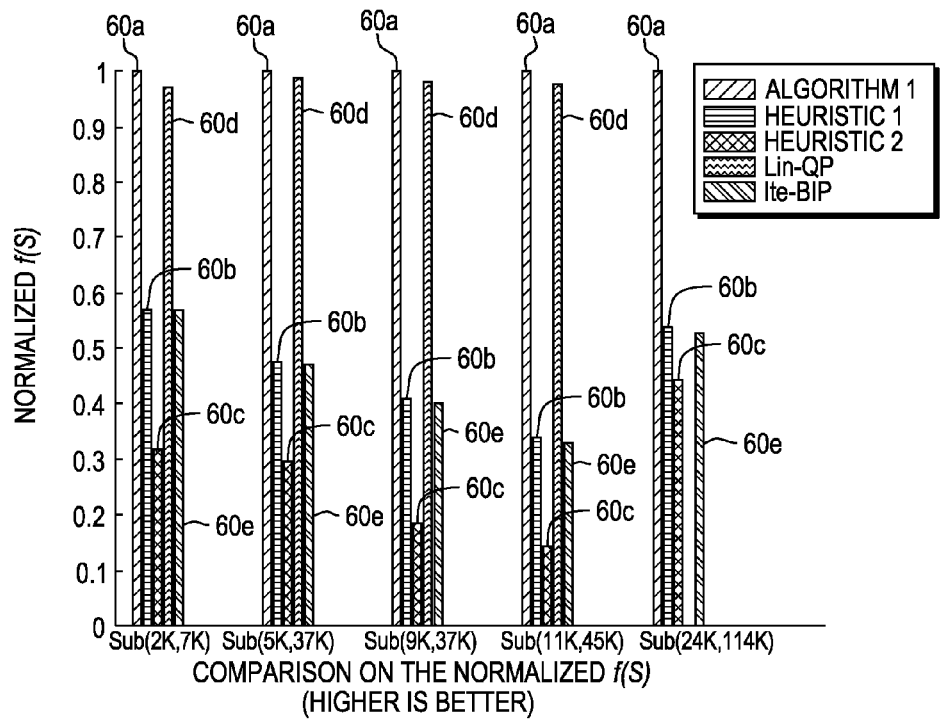
FIG. 6(a) compares the quality of and the amount of time taken by several ranking procedures.
Figure 6B:
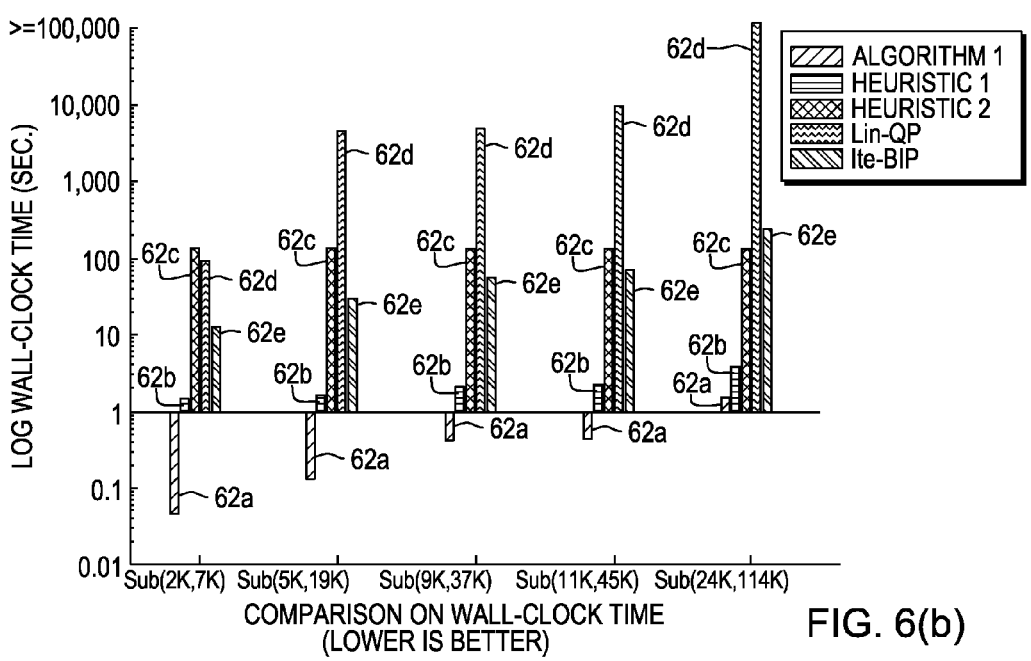
FIG. 6(b) compares the amount of time taken by several ranking procedures.

We also conducted experiments on the co-authorship network constructed from multiple conferences. FIGS. 6(a) and 6(b) show the results on these data sets with the budget k=20. Here Sub(n,m) means a co-authorship network with n nodes and m edges. We stop the program if it takes more than 100,000 seconds (i.e., more than 1-days). In FIG. 6(a), the results from using algorithm 1, Heuristic 1, Heuristic 2, Lin-QP and Lte-BIP are shown at 60a, 60b, 60c, 60d and 60e respectively. In FIG. 6(b), the results from using algorithm 1, Heuristic 1, Heuristic 2, Lin-QP and Lte-BIP are shown at 62a, 62b, 62c, 62d and 62e respectively. It can be seen from FIGS. 6(a) and 6(b) that Alg. 1 is consistently best across all the different data sets—it leads to the highest optimization quality (i.e., highest f(S) for 'Lin-QP' is missing for Sub(24K, 114K) because it fails to finish within 100,000 seconds. This indicates that it is not feasible for large graphs. For the smaller graphs, 'Lin-QP' leads to slightly lower f(S) than Alg. 1; but it requires 3-5 orders of magnitude wall-clock time. For all the other comparative methods, they lead to worse optimization quality with longer wall-clock time.

Figure 7A:
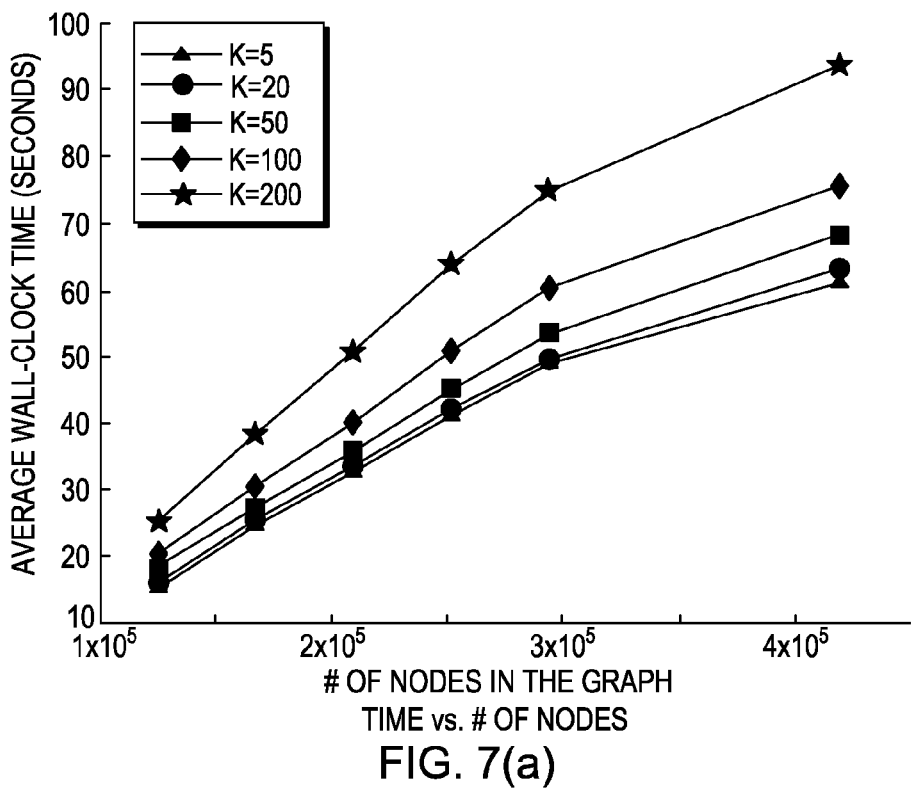
FIGS. 7(a) and 7(b) illustrate the scalability of an algorithm used in an embodiment of the invention.
Figure 7B:
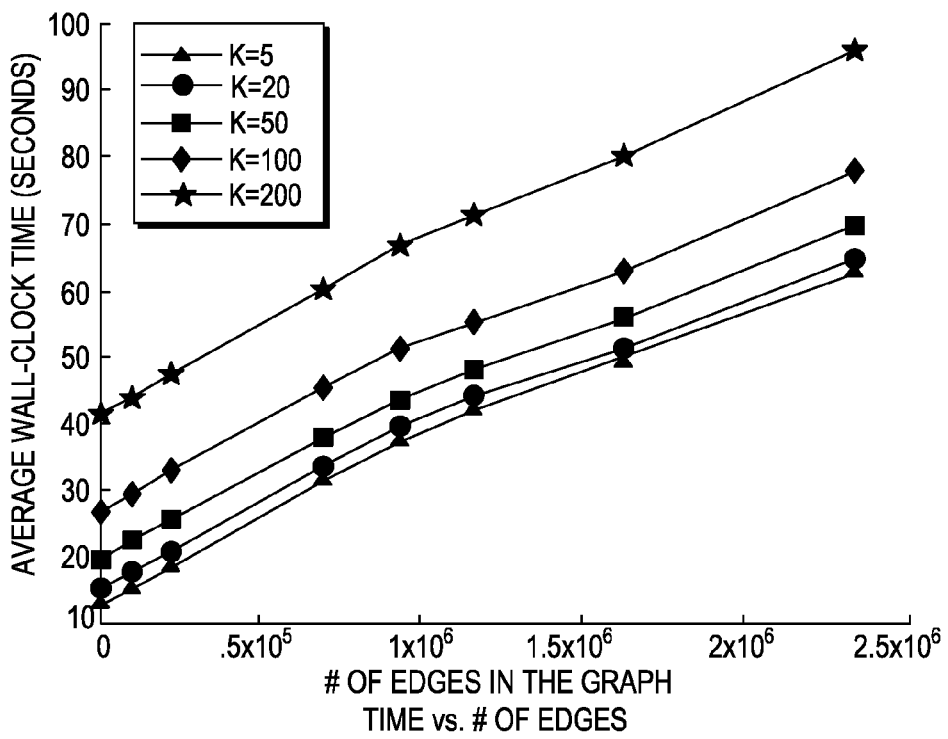

We also evaluate the scalability of Alg. 1. When we evaluate the scalability with respect to the number of the nodes in the graph, we fix the number of edges and vice versa. The results in FIGS. 7(a) and 7(b) are consistent with the complexity analysis discussed above—Alg. 1 scales linearly with respect to both n and m, which means that it is suitable for large graphs.

Figure 8:
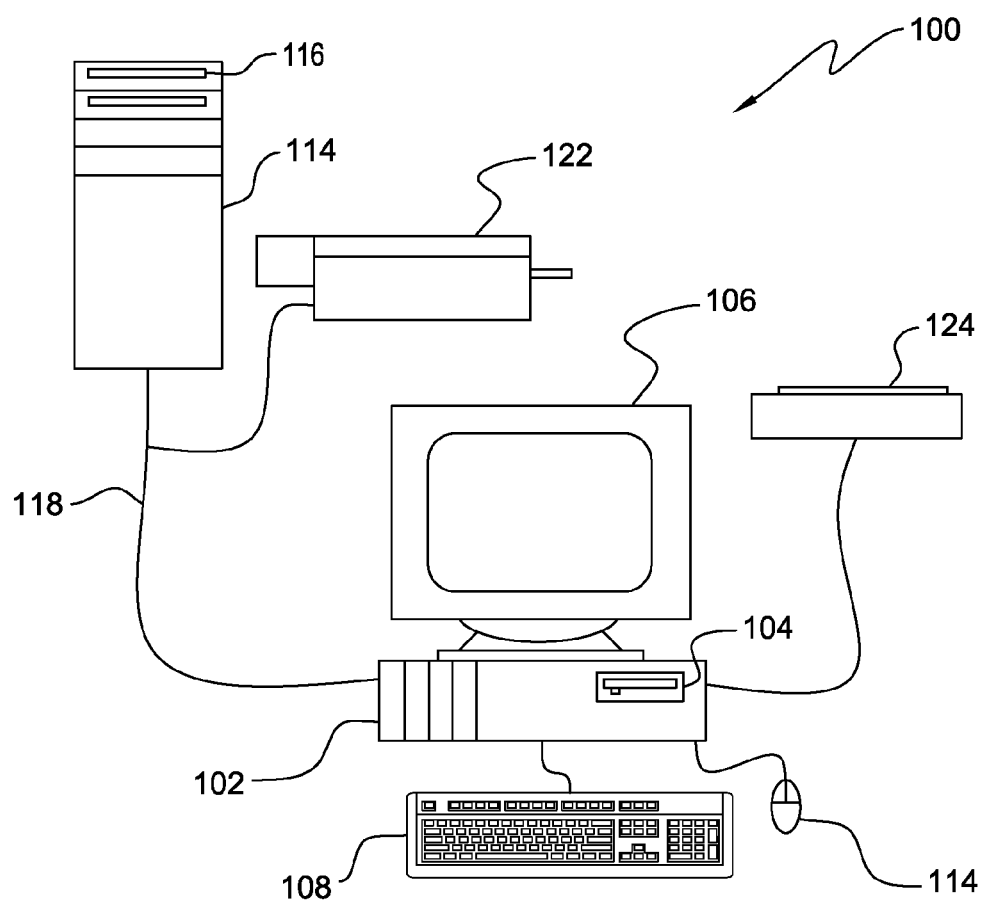
FIG. 8 shows a computing environment that may be used to implement embodiments of the invention.

A computer-based system 100 in which embodiments of the invention may be carried out is depicted in FIG. 8. The computer-based system 100 includes a processing unit 110, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Scanner 180 and printer 170 are provided for document input and output. Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the performance of the processing unit 110.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of finding a subset of k data items from a set of data items for a given query based on a specified measure of relevance and diversity, the method comprising:
   identifying a set of data items responsive to the query; and
   forming a subset S of the data items, including
   putting into the subset S an initial number of the data items; and
   adding one or more of the data items to the subset S, including
   determining a relevance/diversity score f(S) for the subset S measuring both (a) a relevance of the data items in the subset S to the query, and (b) a diversity among the data items in the subset S;
   for each of the data items i not in the subset S, determining a marginal contribution score s(i) for the each data item i by determining a relevance/diversity score f(S, i) for a subset of the data items formed by the union of the subset S and the each data item i, and subtracting f(S) from f(S, i) to obtain the marginal contribution score s(i) for the each data item i,
   adding to the subset S one or more of the data items i based on the marginal contribution scores for the data items i until the subset S has k data items, and
   wherein said relevance/diversity score f(S) for the subset S includes a defined measure of specified similarities that each of the data items in the subset S has to one or more of others of the of data items in the subset S; and
   wherein at least one of said identifying and forming a subset of the data items is carried out by a computer device.

2. The method according to claim 1, wherein the adding to the subset S one or more of the data items i includes:
   repeating the determining a relevance/diversity score f(S) for the subset S, the determining a marginal contribution score s(i) for each of the data items i, and the adding to the subset S one or more of the data items i based on the marginal contribution scores for the data items i until the subset S has k data items.

3. The method according to claim 1, wherein:
   each of the data items in the subset S has a measured relevance to the query determined in accordance with a defined relevance measuring procedure;
   each of the data items in the subset S has a measured diversity value determined in accordance with a defined diversity measuring procedure; and
   said relevance/diversity score f(S) for the subset S includes a combination of the measured relevance and the measured diversity value of the data items in the subset S.

4. The method according to claim 1, wherein the determining a marginal contribution score for each of the data items i includes initializing the marginal contribution scores for the data items i at a specified time, and adjusting the marginal contribution scores at defined times.

5. The method according to claim 4, wherein:
   the forming a subset S of the data items includes starting with an empty subset.

6. The method according to claim 1, wherein the adding to the subset S of the data items includes:
   selecting the one of the data items i having the highest of the marginal contribution scores; and
   adding the selected one of the data items to the subset S of the data items.

7. The method according to claim 6, wherein the adding to the subset S of the data items includes repeating the selecting and adding the selected one of the data items until at least one defined criteria is met.

8. The method according to claim 7, wherein the defined criteria is the marginal contribution score of the data item i added to the subset S is less than a given value.

9. The method according to claim 7, wherein the determining a marginal contribution score for each of the data items i includes adjusting the marginal contribution score of one or more of the data items i each time one of the data items is added to the subset S of the data items.

10. The method according to claim 9, wherein:
    each of the data items in the subset S has a measured diversity value determined according to a defined diversity measuring procedure; and
    the adjusting the marginal contribution scores of one or more of the data items i each time one of the data items is added to the subset S of the data items, includes adjusting the relevance/diversity score f(S) for the subset S each time one of the data items is added to the subset S of the data items.

11. A system for finding a subset of k data items from a set of data items for a given query based on a specified measure of relevance and diversity, the system comprising:
    at least one distinct software module, each distinct software module being embodied on a tangible computer-readable medium; a memory; and
    at least one processor coupled to the memory and operative for:
    receiving a set of data items responsive to the query; and
    forming a subset S of the data items, including
    putting into the subset S an initial number of the data items; and
    adding one or more of the data items to the subset S, including
    determining a relevance/diversity score f(S) for the subset S measuring both (a) a relevance of the data items in the subset S to the query, and (b) a diversity among the data items in the subset S;
    for each of the data items i not in the subset S, determining a marginal contribution score s(i) for the each data item i by determining a relevance/diversity score f(S, i) for a subset of the data items formed by the union of the subset S and the each data item i, and subtracting f(S) from f(S, i) to obtain the marginal contribution score s(i) for the each data item i,
    adding to the subset S one or more of the data items i based on the marginal contribution scores for the data items i until the subset has k data items, and wherein said relevance/diversity score f(S) for the subset S includes a defined measure of specified similarities that each of the of data items in the subset has to one or more of others of the of data items in the subset S.

12. The system according to claim 11, wherein:
each of the data items in the subset S has a measured relevance to the query determined in accordance with a defined relevance measuring procedure; and
each of the data items in the subset S has a measured diversity value determined in accordance with a defined diversity measuring procedure.

13. The system according to claim 11, wherein the determining a marginal contribution score for each of the data items i includes initializing the marginal contribution scores for the data items i at a specified time, and adjusting the marginal contribution scores at defined times.

14. The system according to claim 11, wherein the adding to the subset S of the data items includes:
selecting the one of the data items i having the highest of the marginal contribution scores;
adding the selected one of the data items to the subset S of the data items; and
repeating the selecting and adding the selected one of the data items until at least one defined criteria is met.

15. The system according to claim 14, wherein:
the determining a marginal contribution score for each of the data items i includes adjusting the marginal contribution scores of one or more of the data items i at specified times;
each of the data items in the subset S has a measured diversity value determined according to a defined diversity measuring procedure; and
the adjusting the marginal contribution scores of one or more of the data items i includes adjusting the relevance/diversity score f(S) for the subset S each time one of the data items is added to the subset S of the data items.

16. An article of manufacture comprising:
at least one tangible computer readable hardware device having computer readable program code logic tangibly embodied therein to find a subset of k data items from a set of data items for a given query based on a specified measure of relevance and diversity, the computer readable program code logic, when executing, performing the following:
identifying a set of data items responsive to the query; and
forming a subset S of the data items, including
putting into the subset S an initial number of the data items; and
adding one or more of the data items to the subset S, including
determining a relevance/diversity score f(S) for the subset S measuring both (a) a relevance of the data items in the subset S to the query, and (b) a diversity among the data items in the subset S;
for each of the data items i not in the subset S, determining a marginal contribution score s(i) for the each data item i by determining a relevance/diversity score f(S, i) for a subset of the data items formed by the union of the subset S and the each data item i, and subtracting f(S) from f(S, i) to obtain the marginal contribution score s(i) for the each data item i,
adding to the subset S one or more of the data items i based on the marginal contribution scores for the data items i until the subset S has k data items, and wherein said relevance/diversity score f(S) for the subset S includes a defined measure of specified similarities that each of the data items in the subset S has to one or more of others of the data items in the subset S.

17. The article of manufacture according to claim 16, wherein:
each of the data items in the subset S has a measured relevance to the query determined in accordance with a defined relevance measuring procedure;
each of the data items in the subset S has a measured diversity value determined in accordance with a defined diversity measuring procedure.

18. The article of manufacture according to claim 16, wherein:
the forming a subset S of the data items includes starting with an empty subset; and
the determining a marginal contribution score for each of the data items i includes initializing the marginal contribution scores for the data items i at a specified time.

19. The article of manufacture according to claim 16, wherein the adding to the subset S of the data items includes:
selecting the one of the data items i having the highest of the marginal contribution scores;
adding the selected one of the data items to the subset S of the data items; and
repeating the selecting and adding the selected one of the data items until at least one defined criteria is met.

20. The article of manufacture according to claim 19, wherein:
the determining a marginal contribution score for each of the data items i includes adjusting the marginal contribution score of one or more of the data items i each time one of the data items is added to the subset S of the data items;
each of the data items in the subset S has a measured diversity value determined according to a defined diversity measuring procedure; and
the adjusting the marginal contribution score of one or more of the data items i each time one of the data items is added to the subset S of the data items, includes adjusting the relevance/diversity score f(S) for the subset S each time one of the data items is added to the subset S of the data items.

21. A method of finding a subset of k data items from a set of data items for a given query based on a specified measure of relevance and diversity, the method comprising:
identifying a set of data items responsive to the query;
forming a subset S of the data items;
putting into the subset S an initial number of the data items;
providing each of the data items in the subset S with a measured relevance to the query determined in accordance with a defined relevance measuring procedure, and providing each of the data items in the subset S with a measured diversity value determined in accordance with a defined diversity measuring procedure; and
adding one or more of the data items to the subset S, including
determining a relevance/diversity score f(S) for the subset S measuring both (a) a relevance of the data items in the subset S to the query, and (b) a diversity among the data items in the subset S;
for each of the data items i not in the subset S, determining a marginal contribution score s(i) for the each data item i by determining a relevance/diversity score f(S, i) for a subset of the data items formed by the union of the subset S and the each data item i, and subtracting f(S) from f(S, i) to obtain the marginal contribution score s (i) for the each data item i, adding to the subset S one or more of the data items i based on the marginal contribution scores for the data items i until the subset S has k data items, and wherein said relevance/diversity score f(S) for the subset S includes a defined measure of specified similarities that each of the data items in the subset S has to one or more of others of the data items in the subset S; and wherein at least one of said identifying, providing, and forming subset a of the data items is carried out by a computer device.

22. The method according to claim 21, wherein:

the determining a marginal contribution score for each of the data items i includes initializing the marginal contribution scores for the data items i at a specified time, and adjusting the marginal contribution scores at defined times; and the forming a subset S of the data items includes starting with an empty subset.

23. The method according to claim 21, wherein the adding to the subset S of the data items includes:

selecting the one of the data items i having the highest of the marginal contribution scores;

adding the selected one of the data items to the subset S of the data items; and repeating the selecting and adding the selected one of the data items until at least one defined criteria is met.

24. The method according to claim 23, wherein the determining a marginal contribution score for each of the data items i includes adjusting the marginal contribution scores of one or more of the data items i each time one of the data items is added to the subset S of the data items.

25. The method according to claim 21, wherein the determining a marginal contribution score for each of the data items i includes adjusting the marginal contribution score of one or more of the data items i, at specified times, based on the measured diversity value of one or more of the data items in the subset S of the data items.

* * * * *